July 17, 1962     S. A. ZYSK     3,044,328
PLURAL STEP PRESSURE WELDING APPARATUS
Filed Jan. 28, 1959     6 Sheets-Sheet 1

INVENTOR.
STANLEY A. ZYSK
BY Pyle & Fisher
ATTORNEYS

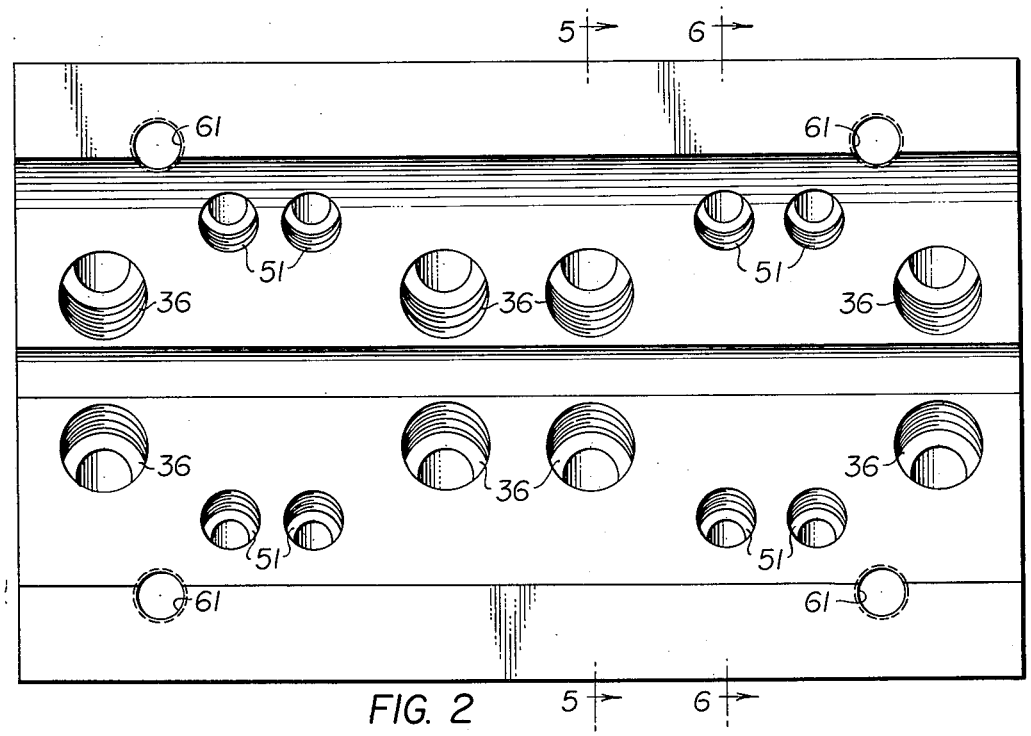
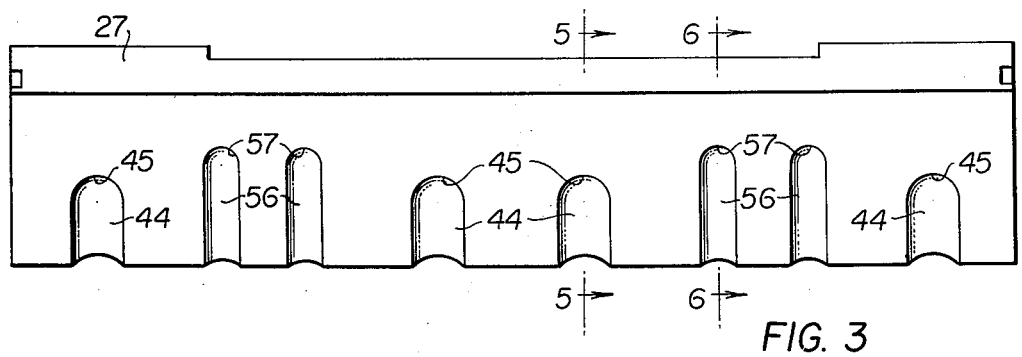
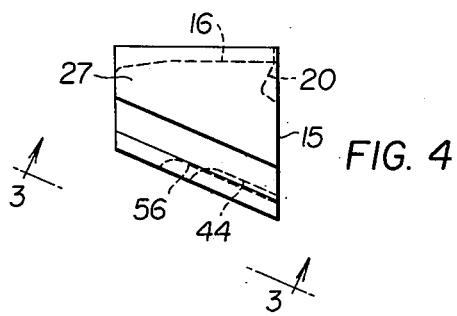

INVENTOR.
STANLEY A. ZYSK
BY Pyle & Fisher
ATTORNEYS

July 17, 1962 S. A. ZYSK 3,044,328
PLURAL STEP PRESSURE WELDING APPARATUS
Filed Jan. 28, 1959 6 Sheets-Sheet 4

INVENTOR.
STANLEY A. ZYSK
BY Pyle & Fisher
ATTORNEYS

July 17, 1962 S. A. ZYSK 3,044,328
PLURAL STEP PRESSURE WELDING APPARATUS
Filed Jan. 28, 1959 6 Sheets-Sheet 5

INVENTOR.
STANLEY A. ZYSK
BY *Pyle & Fisher*
ATTORNEYS

July 17, 1962  S. A. ZYSK  3,044,328
PLURAL STEP PRESSURE WELDING APPARATUS
Filed Jan. 28, 1959  6 Sheets-Sheet 6

INVENTOR.
STANLEY A. ZYSK
BY Pyle & Fisher
ATTORNEYS

United States Patent Office 3,044,328
Patented July 17, 1962

3,044,328
PLURAL STEP PRESSURE WELDING APPARATUS
Stanley A. Zysk, Little Falls, N.Y., assignor to Kelsey-Hayes Company
Filed Jan. 28, 1959, Ser. No. 789,670
1 Claim. (Cl. 78—82)

This invention relates in general to gripping and forming apparatus intended for cold pressure welding, and relates more specifically to mechanism for controlling the closing action of split die sections upon a workpiece, and to the control of movement of the closed split die toward another die with a pressure weld action.

The principal object of this invention is to provide die control means to cause a tight grip upon each workpiece by each split die before the opposed dies can close together.

A further principal object of this invention is to provide pressure welding equipment particularly suited to produce a plurality of repeated pressure weld upsets in rapid succession for welding flat stock of large size requiring excessive power, or of exceedingly thin gauge wherein the workpiece projection cannot be great enough to weld in one pass.

A more specific object of the invention pertaining to sloping cam actuated dies is to provide improved resistance devices which resist the closing movement of the opposed dies and cause a tight gripping action before the dies can close toward one another.

A further object of this invention is to provide a first and second related detent system, wherein one such system provides a preliminary spacing relationship and the other provides the resistance for development of grip.

Pressure welding at temperatures below the temperatures below the temperature required to fuse the metal has been advanced spectacularly in recent years. The basic knowledge that pressure alone could cause a union has long been known. However, reliable commercial application has lagged until the intensified study and research development period of this inventor and his associates.

These inventors, as now revealed in many issued patents, have developed true pressure welds that are absolutely and commercially reliable. It has been found that a true pressure weld requires the mated surfaces to be under extreme pressure and confined to flow away from the weld area while in such contact. The expanding area under load causes some unique interaction of the molecular structure which causes an inseparable union. This true weld union must be differentiated from the common pressure bond which is sometimes popularly confused with a true weld.

Although the basic concept has long been known, and is now much better understood, great ingenuity is often required to carry the concepts into practice. Great pressure per unit of weld cross section is required. Hence, size limitation alone becomes a problem.

Further, careful cleaning is often required, although it is now known that cleaning can be fully disposed of under certain conditions.

It will be shown herein, how apparatus of practical size, can weld materials heretofore considered too large, and how a multiple upset operation can cause self-cleaning.

Other objects and a fuller understanding of the invention may be had by referring to the following description and claim, taken in conjunction with the accompanying drawings, in which:

FIGURE 2 is a plan view of the lower V block alone, looking down as seen in FIGURE 1;

FIGURE 3 is a plan view of a die carried by the lower V block, as taken along line 3—3 of FIGURE 4;

FIGURE 4 is an end view of the die shown in FIGURE 3;

Figure 1:
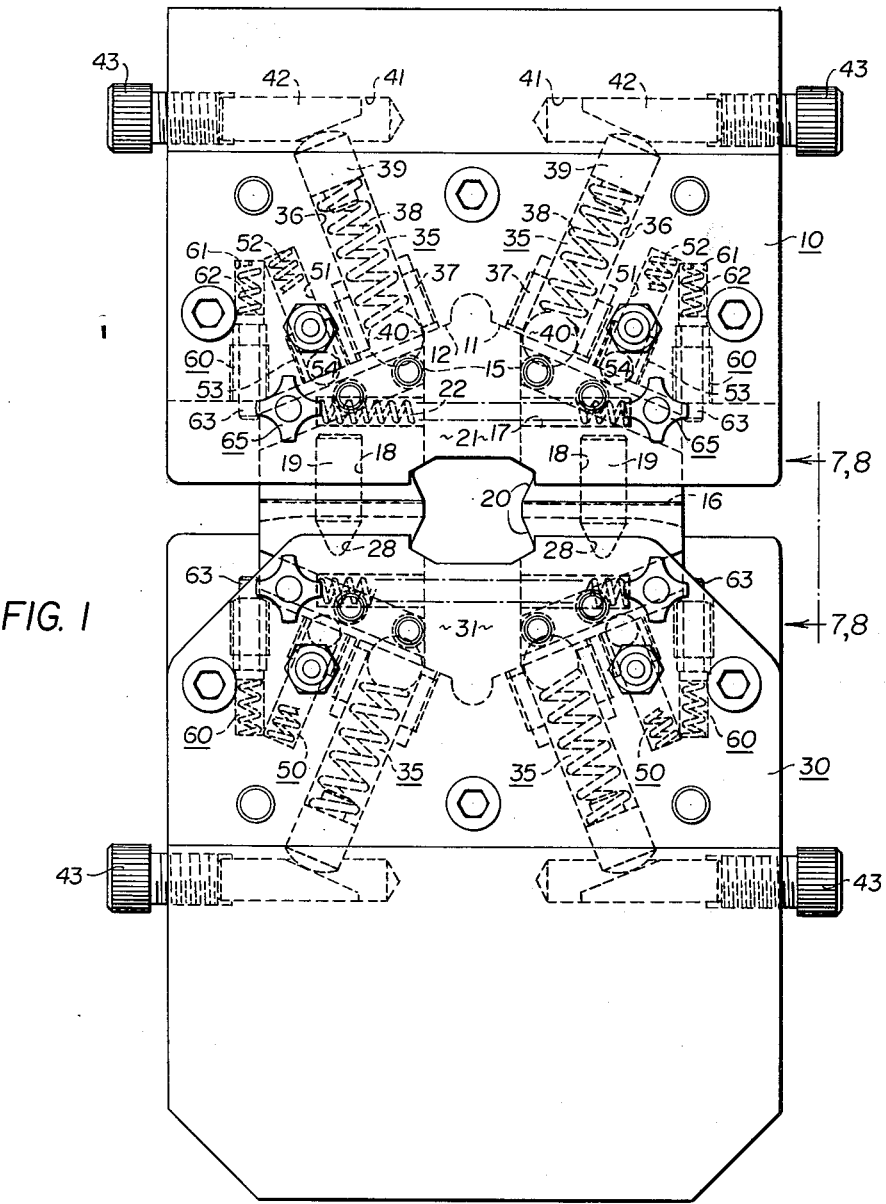
FIGURE 1 is a side elevation of an upper and lower V block carriage and actuating cam, with associated dies and die controls shown in phantom outline therein; the composite as shown being actuated by a power device, such as a hydraulic press, not shown.

Referring now to the drawings there is illustrated an actually used commercial embodiment of the invention which has been developed for the purpose of making automotive wheel rims of aluminum. These automobile rims are formed of strip aluminum and then end butt welded into a continuous annular form. Such a rim requires a considerable total force application to create sufficient metal flow for proper welding.

However, similar apparatus is employed for considerably lighter gauge metals wherein the lighter gauge material is repeatedly upset for the purpose of creating a weld in light gauge material which cannot be projected a distance sufficient to complete a weld in one operation, or for the purpose of causing a sufficiently great flow of material to eliminate the cleaning operation which is normally employed and has always been understood to be a necessary step in true pressure welding.

In the drawings, there is illustrated a top V block carriage 10 and a lower V block carriage 30. No activating device is illustrated in the drawings for the reason that any suitable press type of device will be serviceable. A press is illustrated in the parent application Serial No. 662,291, now Patent No. 2,909,086. It is generally the proper choice to use a hydraulic press for operations requiring the complete series of steps as will be hereinafter described. A hydraulic press may be accurately controlled and may be activated quite slowly or with great speed and force as desired.

The upper V block carriage is formed with cam surfaces 11 and 12 which converge to an apex as best illustrated in the FIGURE 1. The lower V block carriage is similarly constructed with the cam surfaces thereof converging downwardly as illustrated in the FIGURE 1.

Die sections 13 and 25 are carried in the upper V block 10 whereas similar die sections 26 and 27 are carried by the lower V block carriage 30. These die sections are all similarly constructed and the specific form of the die sections may be better understood by referring to the FIGURES 3 and 4. Only the die section 13 will be described in some detail, it being understood that the die sections are all similarly constructed, in reverse and mating form.

The die section 13 has an upper cam surface 14 which is shaped to cooperate with the cam surface 11 of V block 10. A work grip surface 16 is oppositely disposed to cam surface 11. As a press or other actuating device closes the V block carriages 10 and 30 toward one another the die section 13 and the die section 26 will contact and grip a workpiece therebetween. Such contact will cause a pressure and this pressure is caused to create a vector component of force in the direction of a face surface 15 by reason of the sloping formation of the co-operating cam surface 11 on the V block 10 and the sloping cam surface 14 on the die section 13.

The die sections 13 and 26 compose two halves of a split workpiece holding and forming die. Likewise, the die sections 25 and 27 form such a split workpiece holding and forming die. Both of the split dies close together as the V block carriages are closed by a work actuating press, and after gripping a workpiece and the creation of the force vectors in the direction of the split die faces, the dies will close together toward one another and carry the gripped workpieces therealong and create the work action necessary for completing a pressure weld.

As thus far described, the construction and operation of the V block carriages and their associated die sections is not materially different from the previously-described construction set forth in the parent teaching referred to supra.

In order to operate in a multiple series of steps upon a given weld operation, this invention provides unique controls and operating construction in the form of related detents and die holding apparatus. By the proper arrangement of these parts and their sequential operation, a multiple step weld construction is created with ease and certainty of result.

As an aid to the separation of the sections 13 and 25, and the sections 26 and 27, as the V block carriages 10 and 30 are separated, a spring 22 is interdisposed between the sections 13 and 25, and a similar spring is disposed between the die sections 26 and 27. As illustrated with respect to the section 13 a face bore 17 is provided as a spring receiving socket. The springs are then inserted into such sockets between the opposed die section faces and constantly urge the die sections in an outward direction opposed from the vector force direction.

Furthermore, it is essential that the mated die sections of a split die couple be properly aligned with one another each time the sections are closed. For this reason, a guide pin 19 is carried by the top die sections 13 and 25 and are matable into a pin socket 28 on the top surface of each of the dies 27 and 26. Thus, the dies are accurately aligned laterally as they close together prior to moving in the vector force direction.

Furthermore, the dies are formed with a face cavity 20 immediately adjacent the grip surface 16, in a form which has now been substantially uniformly adopted for the proper control of the lateral flow of material being welded. The face cavity 20 extends rearwardly and away from the grip surface 16 to a maximum depth and then reverses to the die face 15. This die face cavity 20 is confined to the area immediately adjacent the work grip surface 16 and in the drawings must be carefully differentiated from the line of a side plate 21 which is secured to the outer surfaces of the V block carriages. These lines are coincident in the position of the assemblies as illustrated, but the die face cavity stops at the die face 15.

The need for great forces in causing the pressure weld has been referred to repeatedly. Therefore, it is a corollary that great gripping forces upon the workpieces are also required. However, were the cam surfaces 11 and 14 allowed to move freely with respect to one another to create the vector force, very little actual gripping force between the gripping surfaces 16 would be generated. The dies would merely contact and the vector force would cause the closing movement to begin immediately. Little such vector force would be required. Therefore, the workpiece would readily slip through the split die sections and the welding force would not be generated. Therefore, pressure detent system 35 is provided to operate in conjunction with the die section 13, and similar pressure detent systems are associated with each of the other die sections. In the illustrated embodiment of the invention: the detent system 35 is provided by means of a bore 36 extending in a direction normal from the cam surface 11 and opening therefrom. A bushing 37 is provided to house a detent ball 40. Ball pressure spring 38 resides behind the ball 40 in the bore 36. A ball spring shoulder pin 39 is carried on the end of the spring 38 as a convenient cam follower device.

Extending from the surface of the V block carriage 10 is a bore 41 which intersects the bore 36. In the bore 41 is a cam wedge 42, which contacts the pin 39 and may thus serve as a cam adjustment to select a degree of compression for the ball spring 38. To adjust the wedge cam 42 into a desired longitudinal position, there is provided a loading adjustment pin 43 which is threadably engaged into the bore 41.

Figure 5:
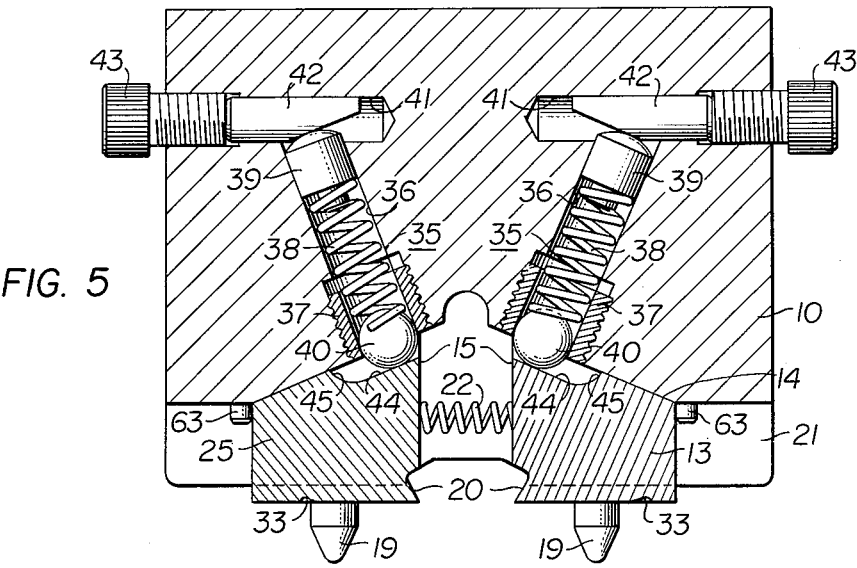
FIGURE 5 is a section through the upper assembly, the location of the section being indicated by a second line 5—5 through the V block and die of FIGURES 2 and 3, which are corresponding portions of the lower assembly.

Reference to the FIGURES 2 and 3 will be helpful to clarify the relative position of the pressure detent 35 and cooperating ball race detent surfaces. The FIGURE 2 is a plan view of the lower V block alone, looking down as seen in FIGURE 1. This illustration of the lower block is for convenience in the inter-relationship of the drawings, and the similar view upwardly of the V block 10 would be substantially identical. Furthermore, the FIGURES 3 and 4 are illustrations of the lower die 27, although all of the die sections are substantially identical. The illustration of the relative location of the pressure detent 35 as shown in FIGURE 5 is taken at a position illustrated by the section line 5—5 of the FIGURES 2 and 3 and this relative position will be readily transposed to the upper V block. The upper and lower pressure detents are similarly located.

From the FIGURES 3 and 4 it will be seen that a series of ball races 44 are positioned along the cam surface 14 of each of the die sections and these ball races are positioned to accept the pressure detent ball 40. Each race 44 ends in an abutment shoulder 45. Therefore, as the die sections close together there is, at first, no resistance to their closing insofar as the pressure detent 35 is concerned. However, advancement of the dies, after contact, in the vector force direction will cause the ball races 44 to move forward until shoulders 45 will contact the balls 40. At this time there is considerable resistance to further movement of the dies in the vector force direction. Hence, a considerably greater pressure between the gripping surfaces 16 is developed before the vector force becomes sufficiently great to cam the ball 40 back into the bushing 37 and allow the shoulder 45 to pass thereunder. This detent operation is controllable in its magnitude by the selection of the strength of the spring 38 and the selection of the additional tension placed upon the spring 38 by the wedge cam 42. Hence, the forging operation for workpiece upset may be accurately controlled by the pressure detent system 35.

There is a second detent system termed a positioning detent and this system is indicated by the reference character 50. A bore 51 from the cam surface 11 extends in a substantially normal direction and is provided with a bushing 53 to house a ball 54. A spring 52 is positioned in the bore 51 behind the ball 54 to provide a desired degree of force urging the ball 54 out of the bore 51.

Referring again to the FIGURES 3 and 4 it may there be seen that there are a plurality of ball races 56 which are related in position to the detent system 50, as suggested by the section lines 6—6 taken through the V block carriage 30 and the die section 27. The races 56 are longer in extent than the races 44 and also end in detent abutment shoulders which are referred to by the reference character 57.

From the spacing relationship of the detent system 35 and the detent system 50, as seen in FIGURE 1, and from the relative length of the ball races 44 and 56 as shown in the FIGURE 3, it will be seen that the detent ball 40 and the detent ball 54 are not in registration with their respective shoulders 45 and 57 at the same time. The positioning detent ball 54 is in contact with its cooperating shoulder 57 in the FIGURE 1 which is the normal rest position of the die sections before operation is begun and during one stage of the later operation which will be explained during a description of the operating sequence of the mechanism.

Figure 6:
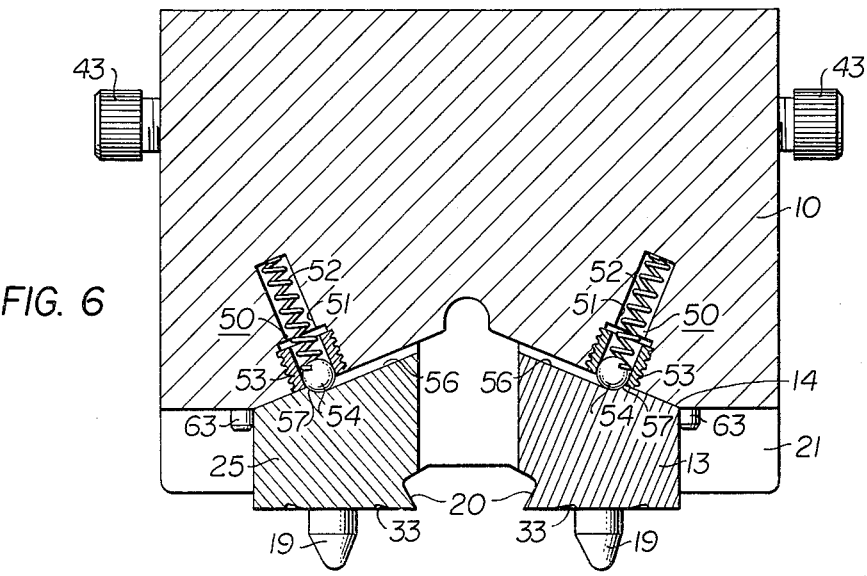
FIGURE 6 is a section through the upper assembly, the location of the section being indicated by a section line 6—6 through the V block and die of FIGURES 3 and 2, which are corresponding portions of the lower assembly.

In order to establish a maximum opening position for the die sections, each die section is equipped with a die block stop pin assembly 60. This assembly is provided by a bore 61 in the V block carriage in a direction generally normal to the vector direction of the die movement. A spring 62 is provided to urge a stop pin 63 to a projection position which may be seen in FIGURES 1, 5, and 6. This pin 63 provides a maximum opening position stop, but the die may be moved outwardly for die changing by retracting the pin 63 against the spring 62 by means of external force.

Figure 7:
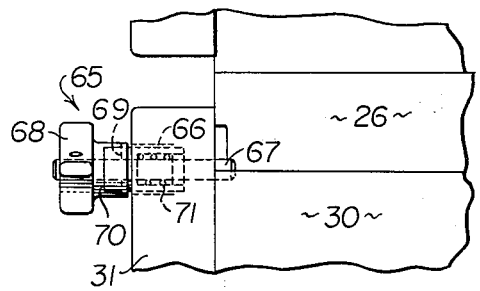
FIGURES 7 and 8 are fragmentary side views taken from FIGURE 1 as indicated by section line 7—7, 8—8, showing an unloading stop pin device in its two operative positions.
Figure 8:
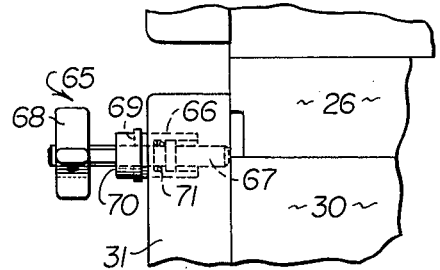
Figure 9:
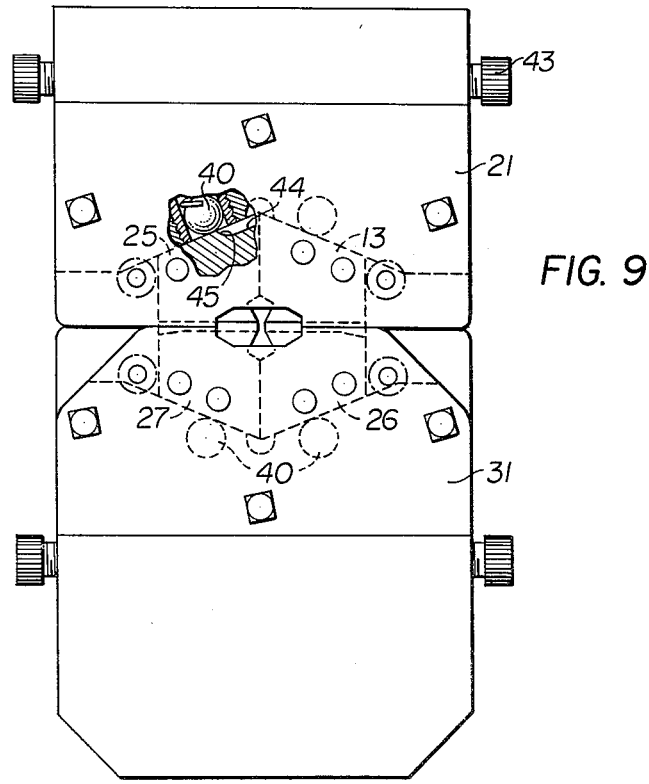
FIGURES 9 through 13 are a side elevation view of the apparatus of FIGURE 1 in various stages of operation.
Figure 10:
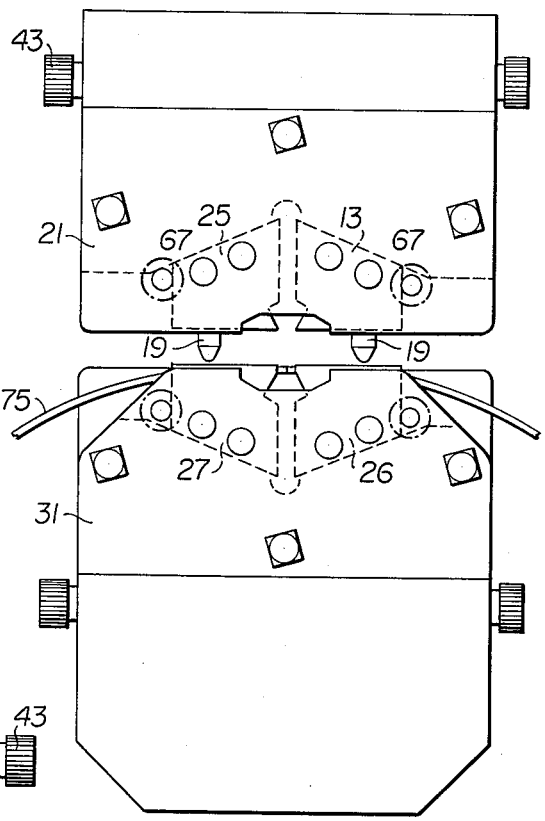
Figure 11:
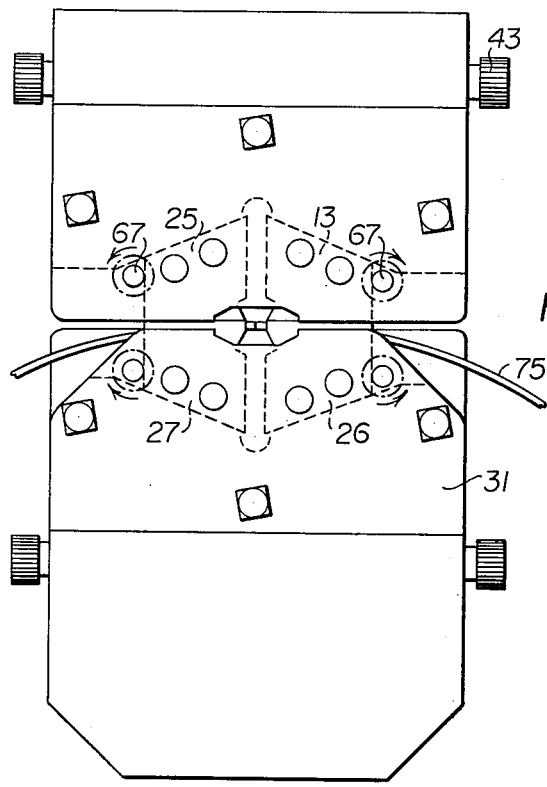
Figure 12:
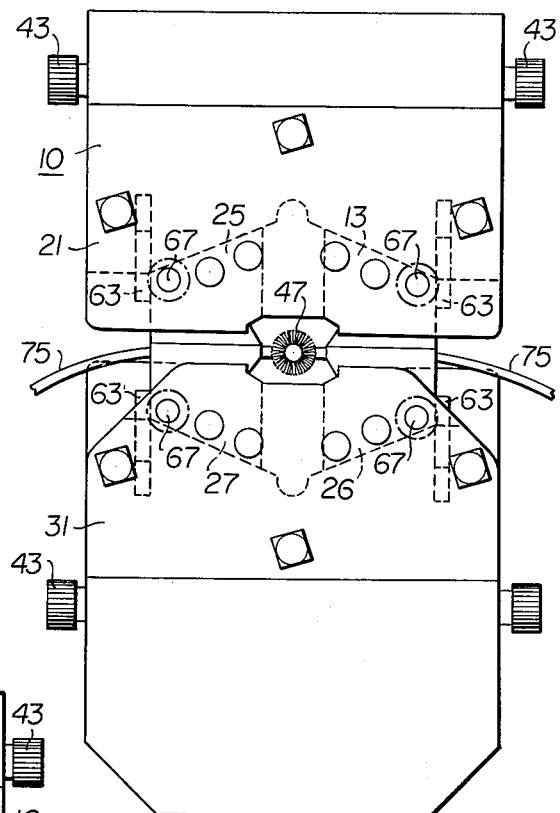
Figure 13:
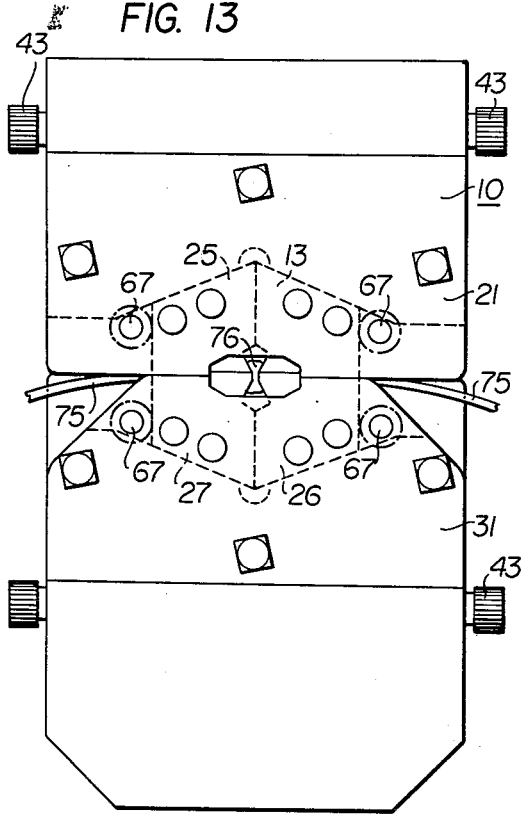

During part of the operation of this apparatus, especially for the operation upon heavy workpieces wherein the workpieces are first indented in order to provide better gripping force, an unloading stop pin assembly 65 is provided and its operation will be better understood during the later description of the operating sequence of this apparatus. This unloading stop pin assembly 65 may be best seen in FIGURES 7 and 8 of the drawings. A pin holder 66 carries a longitudinally shiftable pin 67. A knob 68 provides manual positioning of the pin 67. The holder 66 is recessed as indicated by the reference character 69 and the pin carries mating shoulders 70. A spring 71 causes a constant urge upon the spring 67 to move in an inward direction wherein the pin 67 will project behind the die section and prevent longitudinal return of the die section to a position against the back stop pin assembly 60. The pin 67 may project into such forward blocking position by registration of the shoulders 70 into the recesses 69. The pin 67 is held in a retracted position by grasping the knob 68 and moving the pin and shoulders to a disengaged position with respect to the recesses 69. By turning the knob 68 to a ninety degree position with respect to the recesses 69, the shoulders then abut against the outer end surfaces of the holder 66 and prevent the pin from projecting behind the dies.

*Operational Sequence for the Welding of Heavy Sections*

Because the illustrated apparatus was built for the specific purpose of welding automotive wheel rims, such a workpiece has been selected to illustrate the apparatus through a complete work cycle. In the creation of a pressure weld, the workpieces are grasped by the split die members with a very closely controlled projection of the workpiece from the surface of the die. The amount of projection is related to the thickness of the workpiece and the selection of a proper projection according to the principles of pressure welding is now well known and understood by those skilled in this art. The projection is generally about equal to the thinnest cross section of the workpiece. This projection is necessary to provide metal to contact the other workpiece to which it is being welded and to allow this metal to meet and expand constantly under extreme force and in a direction and with a characteristic prescribed and controlled by the formation 20 of each of the die sections, mated together into a composite flow formation cavity. Too little metal will not cause sufficient controlled flow, whereas too much projection will cause the workpieces to merely deflect under the load and hence fail to produce the required interfacial action which produces a true pressure weld. Deflection may possibly allow a pressure bond, but this invention is concerned with the production of a true pressure weld.

Accordingly, the first step in the operation of this apparatus is to bring the V block carriages 10 and 30 together until the die sections mate and move toward one another under the vector forces. This closing movement causes the dies to move forward of the location of the unloading stop pins 65. With the press full closed and the dies thus moved forward, the unloading stop pins 65 are moved forward to engage behind the die sections. The press is then raised enough to allow the dies to come back against the pins 67 and to separate the grip surfaces 16. When the dies are thus held closed somewhat with respect to one another by the pins 67, the die faces 15 are spaced a distance apart equivalent to the necessary total projection of the workpieces to be welded. In this illustrated case, the workpiece 75 is a single wheel rim blank and the two ends of the workpiece constitute the workpiece members to be joined. Thus, after the press is opened, the workpieces are inserted through the respective split dies until they contact substantially in the middle area between the face surfaces 15. Thus, the total amount of metal between the surfaces 15 will approximate a projection on each workpiece end equivalent to the proper projection related to the thickness of the workpiece. Such visual centering of the abutment area can be quite accurately carried out, especially with criteria marks, if so desired. This and subsequent operational steps may be followed by referring to the FIGURES 9 through 13 of the drawings, intended to illustrate this sequence.

After thus positioning the workpiece ends between the dies, the upper V block carriage 10 is moved down to grip the workpieces and apply an initial pressure for setting gripping dimples on the work surfaces to aid in holding, and the die sections are dimpled by recesses 33 along their gripping surfaces. The upper V block carriage 10 is moved down with enough force to cause a tight gripping and to cause dimples to form, but a force great enough to cause the dies to move past the detent holding station of the ball 40 is avoided. At this stage, the ball 40 is in contact with its related shoulder 45, and hence a considerable pressure may be exerted upon the workpieces without causing actual movement of the die sections in the vector direction.

After so forming gripping dimples upon the workpiece surface, and while the press is still in its lower position to hold the V block carriage 10 in its lower position, the unloading stop pins 65 are moved to their relief condition and the upper V block is then raised. Thus, it can be seen that the proper location of the stop pins 65 provides proper spacing of the respective die faces 20 so that when the dies are thus positioned by the stop pins 65 the pieces to be welded will project a predetermined distance from the die faces to obtain a good weld. Therefore, the stop pins 65 actually serve a dual function: First, they provide the proper spacing of the die faces 20; and, second, they locate the gripping surfaces 16 of the die blocks at the proper places on the workpieces. The cam surface 11 and its counterpart on the lower V block may be said to have an angular relationship with a projector thereof meeting at a theoretical apex. As the upper block rises, the theoretical apex shifts laterally. The mated split die sections have a fixed size cam surface angular relationship while they are closed, and hence they will shift laterally under the urge of spring 22 as the theoretical apex shifts. The split dies will maintain contact with the V block cam surfaces in this manner, and hence will stay closed upon the workpiece and carry the workpiece therealong. This retraction is carried forth until the positioning detent balls 54 drop into their respective ball races and the dies are against the back stop pins 60. It is desired at this time to grasp the workpieces firmly while they are yet positioned a distance apart, in order that the end surfaces of these workpieces may be cleaned by a physical cleaning action and yet not disturb the relative projection of the workpieces from the die. Accordingly, a slight pressure is placed upon the upper V block carriage and a vector force is created tending to move the mated split die assemblies toward one another. However, such closing action is resisted by the detent action of the positioning detents 50. Hence, the workpieces are firmly gripped and the ends of the workpieces are held in a spaced condition.

At this time a scratch brush cleaning action is carried out by the use of a rapidly revolving brush 47. Any suitable type of brush device may be employed, and generally a cylindrical type of power brush of common available form is employed. This brush is inserted between the ends of the workpieces and the workpieces are cleaned by a wire brush action which actually removes a portion of the surface of the workpieces to expose a fresh clean surface. As will be described later herein, it is possible to avoid such cleaning step under certain multiple step operations.

After the cleaning operation has been completed, the activating means for the upper V block carriage 10 is brought into play and the carriages are moved completely together through a full weld action. In this closing movement the positioning detent is first overcome with relative ease and the dies move toward one another in the vector direction. The shoulders 45 then engage the balls 40 and resist further closing until an exceedingly great force is created between the gripping surfaces 16, to cause a vector of sufficient force to overcome the detent action of the balls 40. Whenever such detent action of the balls 40 is overcome, the gripping surfaces 16 are under large force and hence the forging action may be safely progressed without fear of the workpieces slipping from the gripping surfaces. The dimples created by the dimpling step described aid in such anti-slippage holding.

If the workpieces are of proper dimension that one cycle of weld is sufficient to completely fill the forming cavity created by the several work die faces 20, then the workpieces may be removed from the apparatus and the flash trimmed to present a complete weld. However, the essence of this invention is its ability to create a multiple step weld action in order to create a weld in exceedingly heavy sections, as well as for other purposes to be further described.

Figure 14:
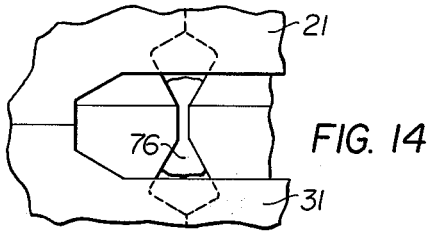
FIGURE 14 is an enlarged fragmentary view of the weld area of FIGURE 13.
Figure 15:
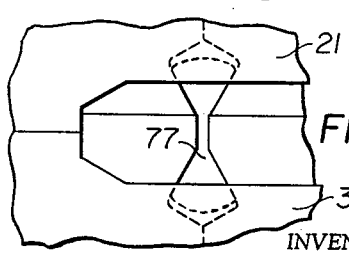
FIGURE 15 is an enlarged fragmentary view of the weld area after a multiple weld cycling with the same workpiece.

The FIGURE 15 is an enlarged fragmentary view of the weld area of the FIGURE 14. Here it will be seen that a first flash 76 has been created which is of relatively small size with respect to the maximum size possible as defined by the mated die face cavities 20. In this instance, the workpiece 75 is too great in thickness to permit a full projection from the die surfaces equal to the amount necessary for a complete weld. Hence, with the workpiece remaining in position, and with the first workpiece flash 76 positioned and maintained about in the center of the apparatus, the V blocks are separated and a full work stroke is repeated in order to grip a distance back on the workpiece and create another welding action. The preliminary steps may now be dispensed with and only the full work cycle induced because the dimpling action and forging action may take place simultaneously.

This repeat performance weld may be carried out to the necessary degree to cause the mated workpieces to completely flow and fill the face cavities, or stated otherwise, until enough material has been caused to flow to create a true pressure weld according to pressure welding techniques.

It is further possible to use apparatus of this construction to produce welds between workpieces without the initial cleansing step carried forth by the brush 47. It has been discovered that this apparatus, by its repeat action performance, can cause workpieces to flow to a degree greater than normal and thus cause contamination to move into the flash and out of the weld area and result in a clean weld. It is not possible to weld pieces with sufficient projection to cause such a welding action in one step; but this apparatus, by operating in repeat sequence, can move the contamination out of the weld area and then proceed with conventional weld action.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

A cold pressure welding device particularly adapted for multiple upset welding, comprising, first and second support members relatively reciprocable along a path of travel, each said member having first and second cam surfaces, the first member cam surfaces forming a V symmetrically disposed about said member path of travel, the second member cam surfaces also forming a V symmetrical about said members path of travel, said first and second member V's being inverted with respect to one another, first, second, third, and fourth die sections, each of said die sections having a cam surface coacting with one of the support member cam surfaces, said first and second sections being carried by the first member, said third and fourth sections being carried by the second member, said first and third sections being a first split die, said second and fourth sections being a second split die, said support members being driven toward one another to thereby cause the split dies to grip first and second workpieces and thereafter cause the split dies and associated workpieces to move towards one another in welding movement to form a cold pressure weld, a first detent system associated with one said support member and said first split die, a second detent system associated with one support member and said second split die, each said detent system comprising a first bore opening from a support member cam surface, said bore having a longitudinal axis substantially normal to said cam surface, a second bore opening from another surface of said support member and intersecting said first bore, a ball detent residing in said first bore and projectable therefrom through the bore opening at the cam surface, a spring in said bore, said spring having a first end means contacting said ball detent and a second end cam follower means, a wedge cam reciprocable in said second bore, said spring cam follower means projecting into said second bore in contact with said wedge cam, longitudinal movement of said wedge cam thereby providing an adjustable compression of the spring, means in said second bore accessible from the exterior of said support member to adjustably position said wedge cam, and detent shoulder means on the mating cam surface of the die associated with the cam surface in registration with said ball detent, a positioning detent bore with a positioning detent residing therein associated with each said split workpiece die, a metal detent receiving recess in the surface of the associated die section, said mated recess having an abutment wall, said abutment wall of the said mated recess and said positioning detent related to mesh at a die position spaced a distance greater than the detent position of the first and second detent.

References Cited in the file of this patent
UNITED STATES PATENTS

| | | |
|---|---|---|
| 1,393,040 | Richard | Oct. 11, 1921 |
| 2,205,079 | Berliner | June 18, 1940 |
| 2,357,204 | Joyner | Aug. 29, 1944 |
| 2,364,938 | Beard | Dec. 12, 1944 |
| 2,553,466 | Morgan | May 15, 1951 |
| 2,863,344 | Barnes | Dec. 9, 1958 |
| 2,932,221 | Barnes | Apr. 12, 1960 |